W. Baker.
Framing for Houses.
No. 3,268. Reissued Jan. 19, 1869.
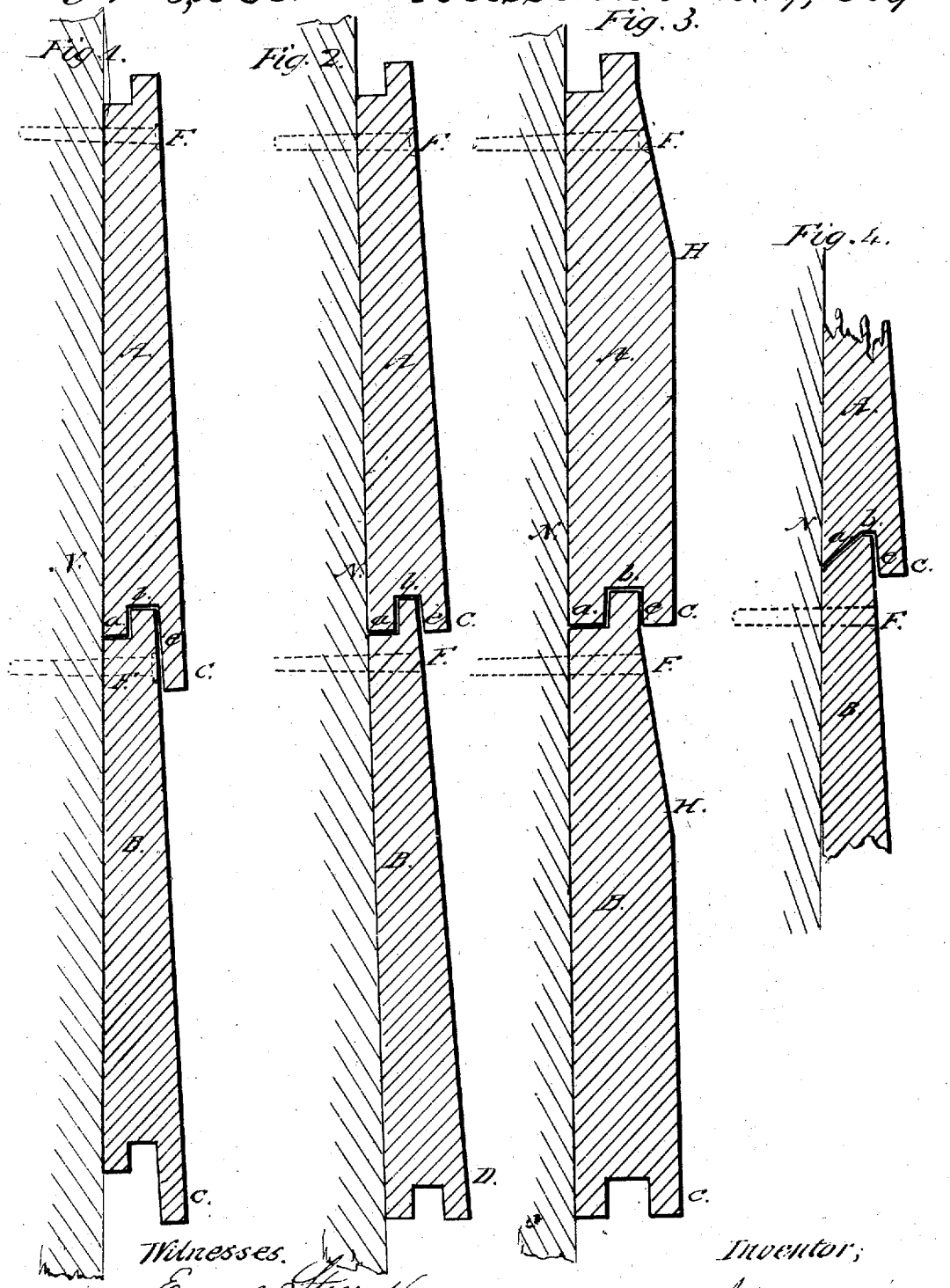
Witnesses.
Eugene Stearns
Abner Gardner
Inventor;
William Baker

UNITED STATES PATENT OFFICE.

WILLIAM BAKER, OF UTICA, NEW YORK.

IMPROVEMENT IN CLAPBOARD-JOINTS.

Specification forming part of Letters Patent No. 1,541, dated May 16, 1854; reissue No. 1,736, dated September 22, 1863; extended seven years; reissue No. 3,268, dated January 19, 1869.

*To all whom it may concern:*

Be it known that I, WILLIAM BAKER, of the city of Utica, in the county of Oneida and State of New York, have invented a new and useful Improvement in the Preparation and Joining of Clapboards and the siding of houses and other buildings; and I do hereby declare that the following is a full and exact description thereof, reference being had to the accompanying drawings, and to the letters of reference marked thereon.

The nature and objects of my invention are so to construct and form the boards for the siding of houses and other buildings that, first, in putting them together, and nailing them to the frame of the building, the boards shall, for their whole width, lie flat and solid against the posts and studs of the frame instead of touching the frame at their corners only, as is the case of ordinary clapboarding; at the same time they shall preserve outside the appearance and advantage of clapboarding, by the outer lip on the lower edge of each board overlapping the full thickness of the upper edge of the board immediately below it for shedding the water; and, second, by extending the outer lip of the upper board sufficiently for that purpose, may also cover the heads of the nails by which the boards are fastened to the frame, these being driven near the upper edge of the boards, where a small nail is sufficient, as the boards are thinner at this point.

In Figure 1 of the annexed drawings, A and B represent transverse sections of two of my clapboards as nailed to the frame of the building, where all the features above stated of the invention are shown, viz: The boards A and B lie for their whole width snug up against the stud N of the frame, while on the outside, as shown at C, they maintain the appearance and advantage of clapboarding, by the upper board overlapping the lower one for shedding the water, and the lip C being here lengthened for that purpose, the head of the nail F is also covered. The extension of the length of the lip C is not necessary, except for the purpose of covering the heads of the nails; and where this is not desired this outer lip is sufficient for appearance, and for shedding the water, if of the same length as the lip *a* in the rear, as shown at C, Fig. 2.

It will be seen that the upper edge of the board, in order that it may allow the board above to overlap it by the lip C, is made thinner than the lower edge. When the boards are made by splitting a thicker board, by a diagonal cut of the saw, making two feather-edged boards of one thicker board, the outside bevel of the board which makes the thin edge is, by the cut of the saw, made to extend across the entire width of the board, as from F to D, Fig. 2; but it is not necessary that the bevel should thus extend across the entire width of the board.

It is sufficient for the purposes of the invention, as first above stated, that the upper edge of the board be made thinner to open the water-shed, and develop the outside appearance of clapboarding, by allowing the bevel to be much shorter, as shown at F H, Fig. 3. This is most convenient when the improvement is made of a board without splitting. These figures show the manner in which the boards are dressed and put together when laid on the frame, N representing a stud of the building-frame, and A and B two of the boards nailed to the same. It is to be observed that the stud N is represented as standing upright; and A and B represent not the length, but the width of the boards as if cut off transversely to their length. The configuration of the cut *a b e* is clearly seen in the figures. It is plain that, if the board B is first laid on, and nailed near its upper edge, as shown at F, the lower edge of the next board A, when brought to its place, as shown in the figures, will be held securely, by the lock *a*, without nailing; and that the nail therefore may be driven in this board also, at F, near the upper edge, as shown, and so on with each successive board. This lock *a* is not necessarily made of the rectangular form here shown; but the tongue *a* may be of a triangular shape, as shown in Fig. 4. In either form the lock answers the same purpose. It is also plain that, by lengthening out the lip C, as shown in Fig. 1, the head of the nail driven in the preceding board will be effectually covered. For this purpose the lip C is made about three-fourths of an inch in length. The lips *a* and *i*, Fig. 1, and the lip C, as shown in Fig. 2, are a little more than one-fourth of an inch long.

The drawings exhibit the boards of the ordinary width and thickness, and the several members of the joint of the proper relative dimensions substantially. Thus the siding of houses is greatly improved, partaking of the solidity, warmth, and security of matched ceiling, while at the same time it possesses the advantages of clapboarding, in more effectually shedding the water outside, of comparatively lightness of covering, and of great neatness of appearance.

Having thus described my invention, and the objects to be attained by it, what I claim as new, and desire to secure by Letters Patent, is—

1. The construction of the joint of clapboards, or jointed siding for houses and other buildings, in such manner that the boards, when laid on the frame, shall lie flat and solid for their whole width against the frame of the building, and at the same time shall preserve the appearance and advantage of clapboarding in front, by the outer lip of the upper board at each joint overlapping outside the board next below it for shedding the water, as described.

2. The combination of the lock *a*, in the rear of the joint, for holding the board to the frame at the lower edge, as described, with the extended lip C, Fig. 1, in front, for covering the head of the nail, as described, the whole being constructed, combined, and arranged, substantially in the manner and for the purposes herein set forth.

WILLIAM BAKER.

Witnesses:
EUGENE STEARNS,
ABNER GARDNER.